(12) United States Patent
Hoffman et al.

(10) Patent No.: US 7,012,346 B2
(45) Date of Patent: Mar. 14, 2006

(54) LOW PROFILE D.C. BRUSHLESS MOTOR FOR AN IMPELLER MECHANISM OR THE LIKE

(75) Inventors: Leslie C. Hoffman, Westwood, CA (US); Barton J. Kenyon, Leichhardt (AU); David B. Sears, Woodland Hills, CA (US)

(73) Assignees: ResMed Limited, North Ryde (AU); Servo Magnetics, Inc., Canoga Park, CA (US)

( * ) Notice: Subject to any disclaimer, the term of this patent is extended or adjusted under 35 U.S.C. 154(b) by 55 days.

(21) Appl. No.: 10/795,207

(22) Filed: Mar. 5, 2004
(Under 37 CFR 1.47)

(65) Prior Publication Data

US 2005/0012411 A1    Jan. 20, 2005

Related U.S. Application Data

(60) Provisional application No. 60/453,038, filed on Mar. 7, 2003.

(51) Int. Cl.
  *H02K 5/08* (2006.01)
  *F04D 13/06* (2006.01)
(52) U.S. Cl. .......................... 310/43; 310/217; 310/89; 310/90; 310/63; 417/423.7; 417/423.14; 417/423.12
(58) Field of Classification Search ................ 310/63, 310/43, 90, 67 R, 217, 89; 417/423.7, 423.12, 417/423.14, 420, 354, 356, 423.15; 415/55.1, 415/55.2
See application file for complete search history.

(56) References Cited

U.S. PATENT DOCUMENTS

| | | | | |
|---|---|---|---|---|
| 4,164,690 A | * | 8/1979 | Muller et al. ............... | 318/254 |
| 4,836,147 A | * | 6/1989 | Morris ..................... | 123/41.44 |
| 5,135,363 A | * | 8/1992 | Harmsen et al. ............ | 417/354 |
| 5,591,017 A | * | 1/1997 | Dwyer ....................... | 417/366 |
| 6,023,113 A | * | 2/2000 | Otsuka ...................... | 310/67 R |
| 6,036,456 A | * | 3/2000 | Peters et al. ............. | 417/423.3 |

(Continued)

*Primary Examiner*—Karl Imayoshi Tamai
(74) *Attorney, Agent, or Firm*—Nixon & Vanderhye P.C.

(57) ABSTRACT

An impeller and at least a portion of a cooperating peripheral volute may be integrated into, and preferably are integrally injection molded with, concentric outer rotor and inner stator assemblies, respectively, to achieve a low profile precision impeller mechanism based on an improved brushless d.c. motor with low length (L) to diameter (D) ratio and suitable for use in a variety of other applications. In one practical embodiment of such a motor, a rotating cap has an inner circumference which is molded about an outer ferromagnetic back ring that in turn supports a permanently magnetized ring shaped rotor magnet having a number of poles of alternating polarity defined about its inner circumference and separated by a relatively small cylindrical air gap from the outwardly projecting radially oriented selectively magnetized poles of a fixed stator assembly. In one exemplary embodiment, the rotor may have 8 poles and the stator may have 9 poles. The fixed stator assembly is preferably integrally molded into a base housing that also includes a precision fixed bearing support that extends upwardly through the center of the stator assembly and that is rotatably coupled to a rotating shaft that extends downwardly from (and preferably is integral with) the center of the rotating cap. A coaxial pair of preloaded ball bearings is preferably supported between an inner cylindrical surface of the fixed bearing support and an outer cylindrical surface of the rotating shaft, to thereby permit the rotor to rotate precisely about the stator with minimal variation in the cylindrical air gap therebetween.

20 Claims, 6 Drawing Sheets

U.S. PATENT DOCUMENTS

| | | | | |
|---|---|---|---|---|
| 6,065,946 A | * | 5/2000 | Lathrop | 417/423.14 |
| 6,359,934 B1 | * | 3/2002 | Yoshida | 375/262 |
| 6,501,616 B1 | * | 12/2002 | Neal | 360/99.08 |
| 6,551,074 B1 | * | 4/2003 | Kudo et al. | 417/354 |
| 2002/0025261 A1 | * | 2/2002 | Kudo et al. | 417/354 |
| 2005/0012411 A1 | * | 1/2005 | Hoffman et al. | 310/63 |

\* cited by examiner

LOW PROFILE D.C. BRUSHLESS MOTOR FOR AN IMPELLER MECHANISM OR THE LIKE

This application claims the benefit, under 35 U.S.C. §119(e)(1), of U.S. Provisional Application No. 60/453,038, filed on Mar. 7, 2003.

BACKGROUND

The present invention relates generally to d.c. motors and more particularly to an improved d.c. brushless motor having a low length to diameter ratio and suitable for use with a low profile impeller mechanism.

SUMMARY

In accordance with a first aspect, an impeller and at least a portion of a cooperating peripheral volute are formed on, and preferably are integrally injection molded with, respective concentric outer rotor and inner stator assemblies, to achieve a low profile precision impeller mechanism based on an improved brushless d.c. motor with low length (L) to diameter (D) ratio.

In accordance with a second aspect, an improved low profile brushless d.c. motor suitable for use in a variety of different applications includes an injection molded rotating cap which has an inner circumference which is molded about an outer ferromagnetic back ring that in turn supports a permanently magnetized ring shaped rotor magnet having a number of poles of alternating polarity defined about its inner circumference and separated by a relatively small cylindrical air gap from the outwardly radially projecting selectively magnetized teeth of a fixed stator assembly. In one exemplary embodiment the rotor may have 8 poles and the stator may have 9 radial slots defining 9 respective teeth. The fixed stator assembly is preferably integrally molded into a base housing that also includes a precision fixed bearing support that extends upwardly through the center of the stator assembly and that is rotatably coupled to a rotating shaft that extends downwardly from (and preferably is integral with) the center of the rotating cap. A coaxial pair of preloaded ball bearings is preferably supported between an inner cylindrical surface of the fixed bearing support and an outer cylindrical surface of the rotating shaft, to thereby permit the rotor to rotate precisely about the stator with minimal variation in the cylindrical air gap therebetween.

DRAWINGS

Hereinafter, some exemplary embodiments of the present invention will be described in reference to the attached drawings, which are not necessarily to scale and which include reference labels to indicate various features thereof, like labels referring to like features throughout both the drawings and the written description. A description of one or more preferred or otherwise exemplary embodiments is not to be taken in a limiting sense, but is made merely for the purpose of describing the general principles of the invention. Additional embodiments, features and/or advantages of the invention will become apparent from the ensuing description or may be learned by the practice of the invention.

DETAILED DESCRIPTION

Figure 1:
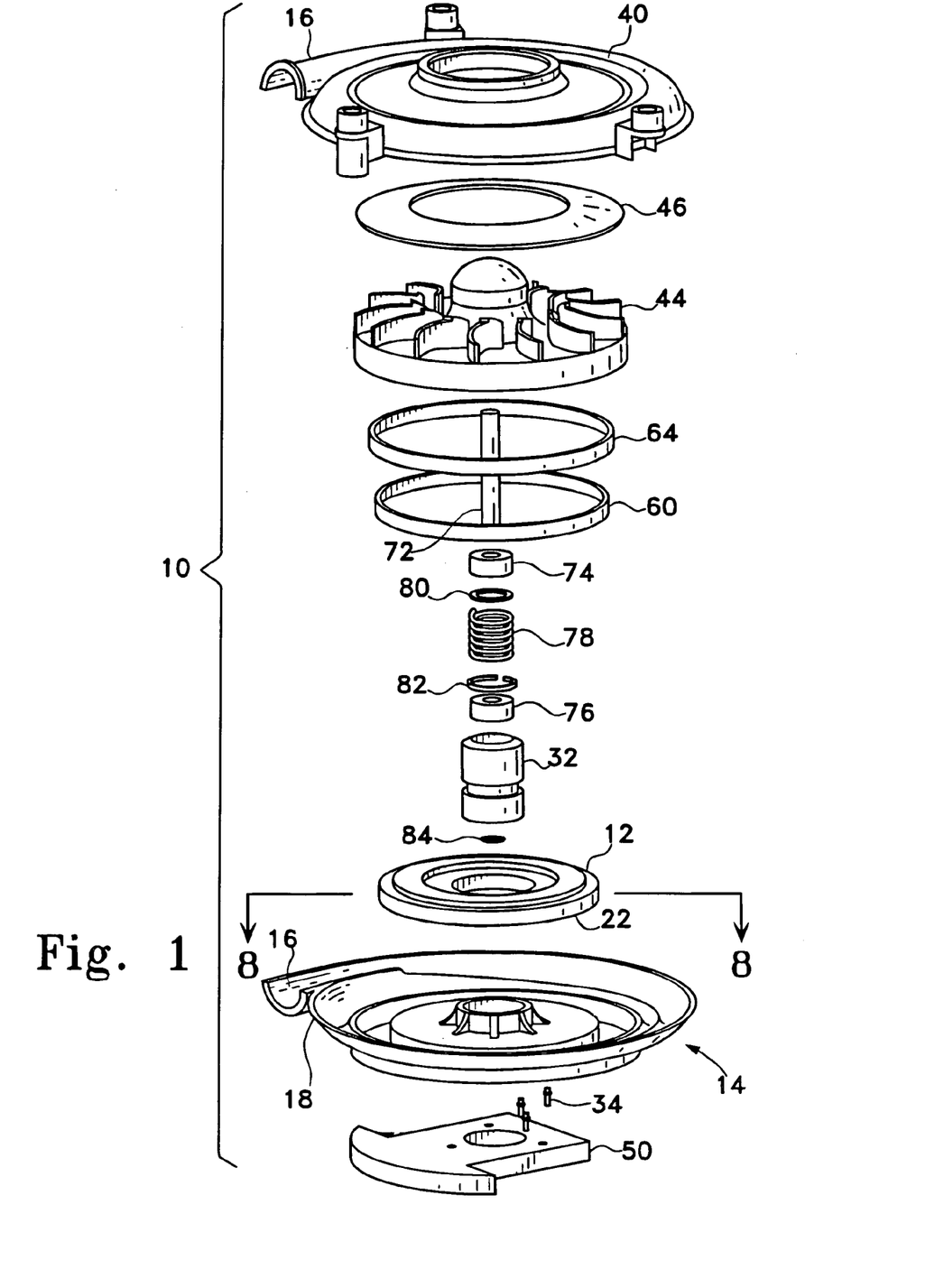
FIG. 1 is a first exploded perspective view of a exemplary d.c. brushless motor in accordance with the present invention.
Figure 2:
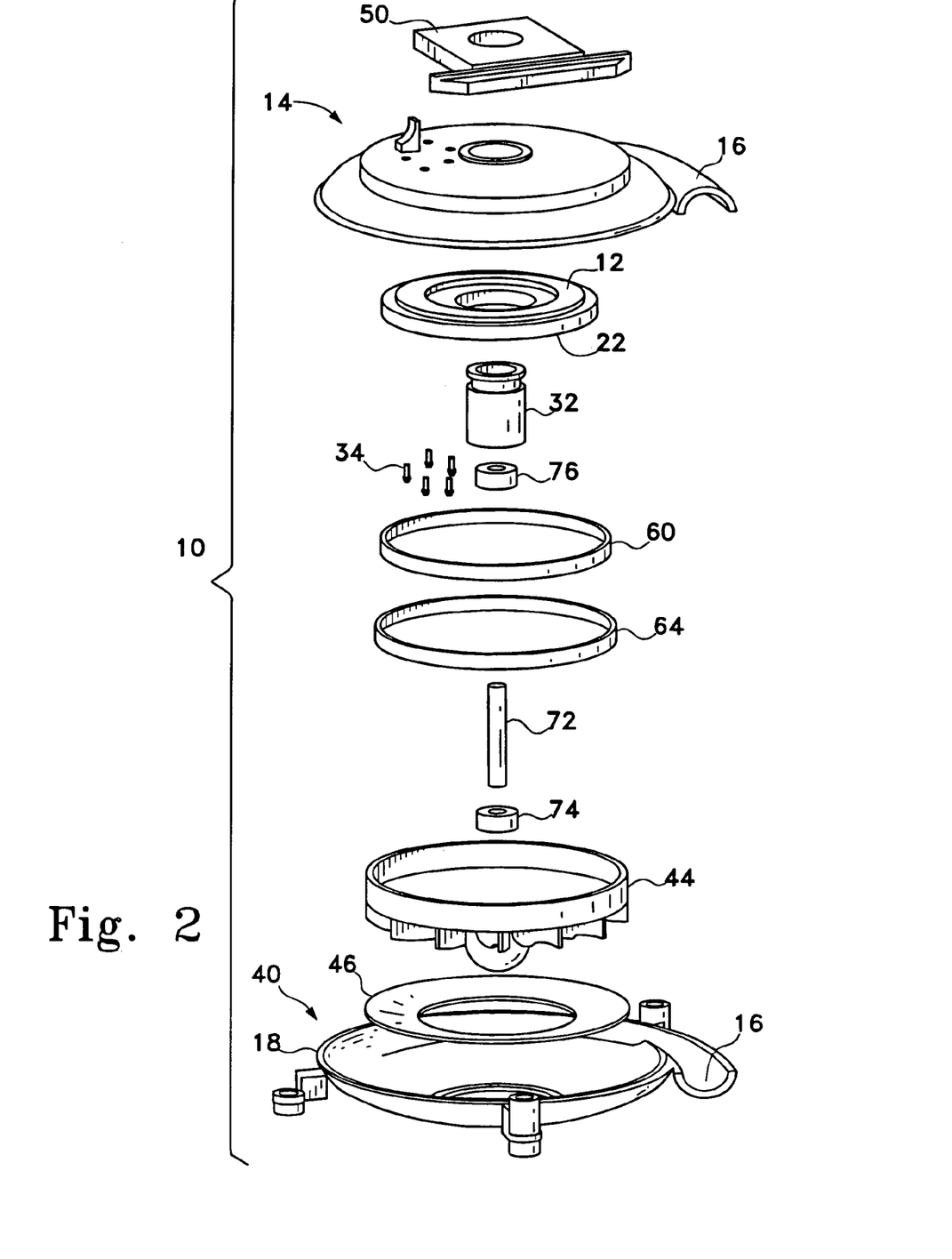
FIG. 2 is a second exploded perspective view of the d.c. brushless motor of FIG. 1.
Figure 3:
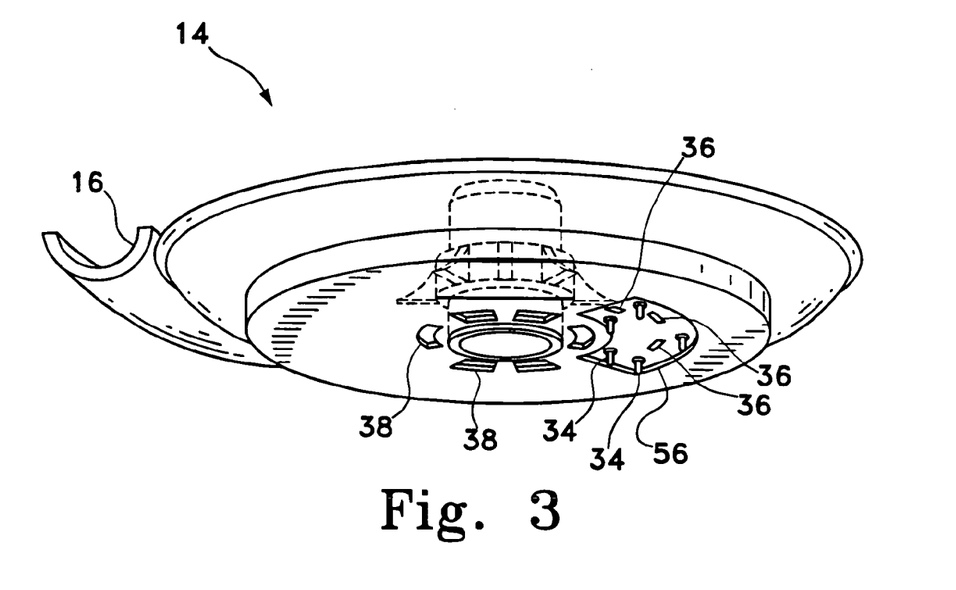
FIG. 3 is a bottom perspective view of an exemplary integrally molded motor housing base portion suitable for use in the d.c. brushless motor of FIG. 1.
Figure 4:
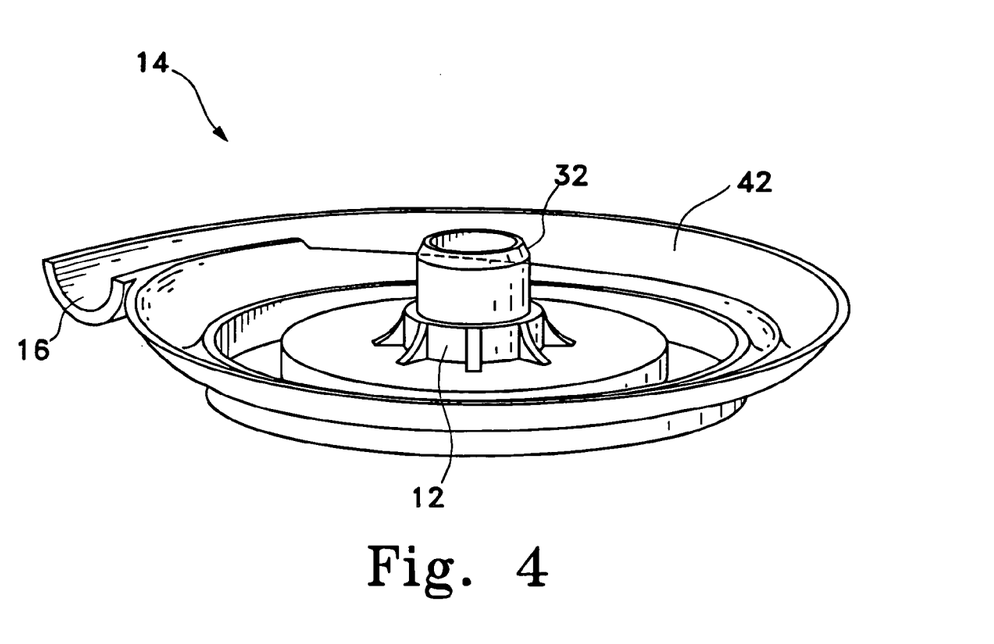
FIG. 4 is a top perspective view of the motor housing base portion of FIG. 3.
Figure 7:
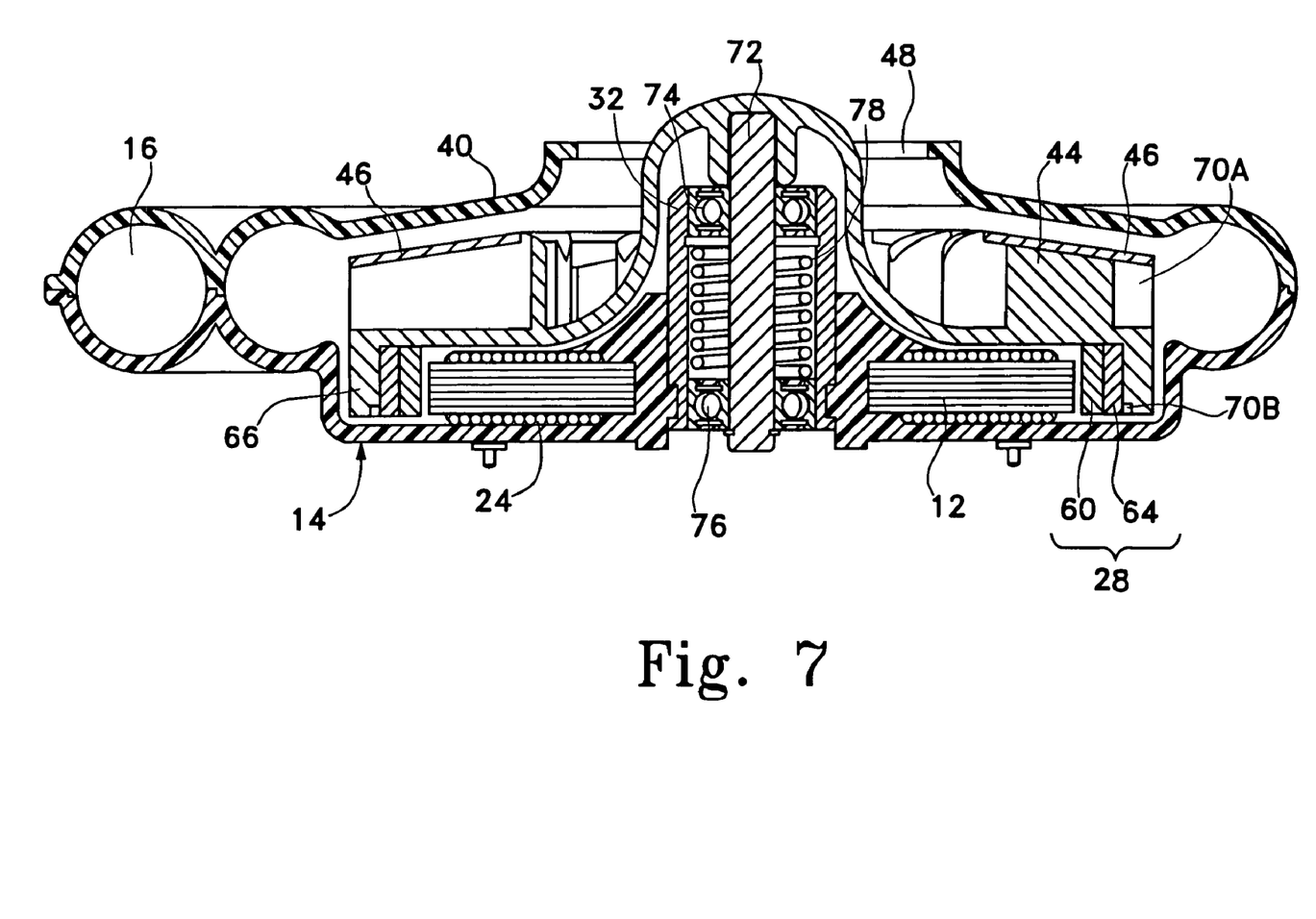
FIG. 7 is a cross-sectional view of a second exemplary d.c. brushless motor corresponding generally to section lines 7—7 of FIG. 5.

As shown in FIG. 1, which is a first exploded perspective view of a exemplary d.c. brushless motor in accordance with the present invention. and as shown in more detail in the second exploded perspective view of FIG. 2, the top perspective view of FIG. 3, the bottom perspective view of FIG. 4, and the cross-sectional view of FIG. 7, a preferred embodiment of the present invention may include a generally ring-shaped stator assembly 12 for a d.c. brushless motor 10 is injection molded as an integral part of a motor base housing 14 having the lower portion of an exit volute 16 about its outer periphery 18. The mating upper portion of the assembly, or cover 40, may contain certain completing features of the volute as it does in this exemplary d.c. brushless motor, or it may be a simple cover with an inlet hole.

The exemplary stator assembly 12 (see also FIG. 8) includes a plurality of radially extending slots collectively defining a like number of rotor teeth 20 about an outer circumference 22 of the stator assembly, and a respective low profile layer electrical winding 24 wound about an intermediate portion of each of the teeth 20 between two adjacent slots for selectively magnetizing a respective tooth of the stator assembly 12. Such a stator assembly may be constructed, for example, from M19 silicon steel laminations, low viscosity adhesive such as Loctite® (ethyl cyanoacrylate), copper magnet wire windings, and 3M® Scotchcoat® electrical resin. The entire stator assembly 12 is preferably integrally molded into the base housing 14 by embedding it in the same injection moldable engineered thermoplastic material such as polycarbonate (which may be loaded with glass fibers or other materials for added strength or thermal conduction purposes) from which the base housing 14 is formed. In accordance with another embodiment of the present invention, the laminated stack which defines the individual arms 20 and associated stator slots and stator teeth, and which provides the flux-carrying medium within the stator assembly 12 between two adjacent teeth, may be replaced with a powdered metal stack (not shown).

Figure 8:
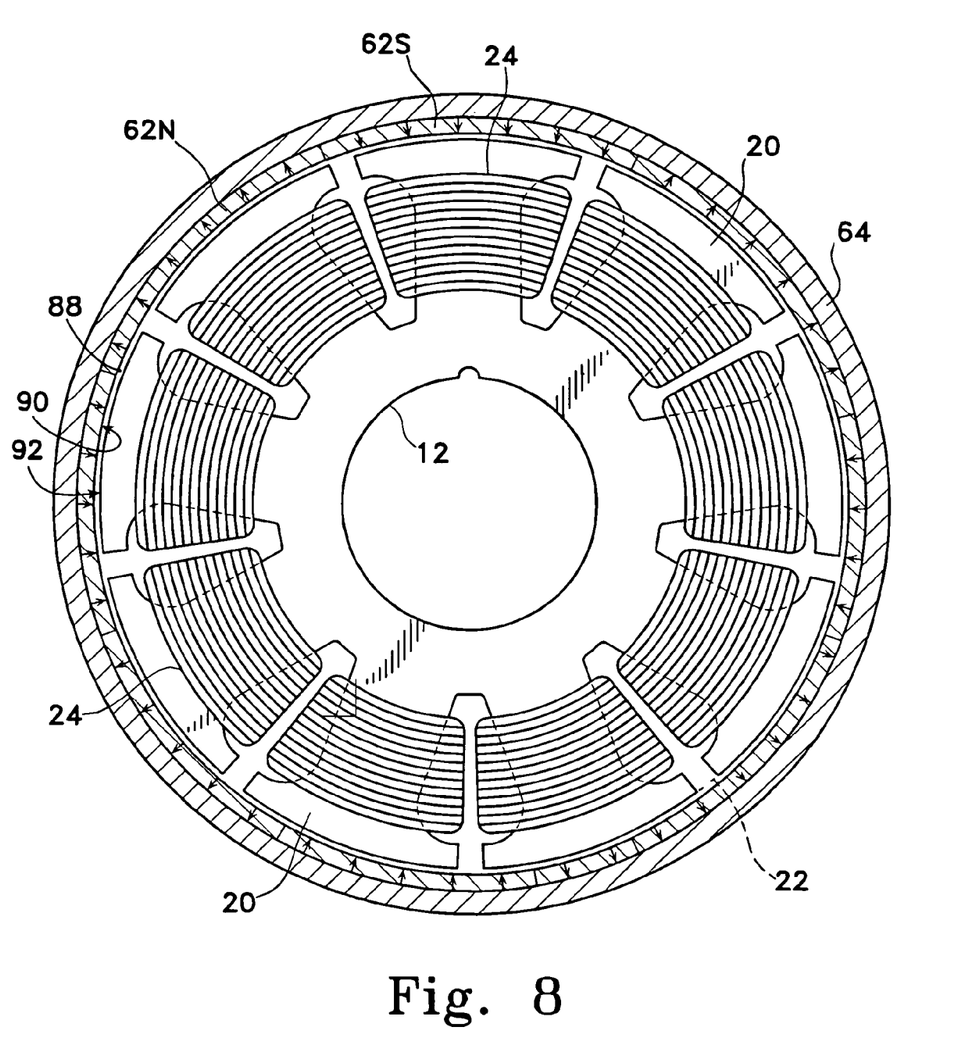
FIG. 8 is a cross-sectional view of an exemplary stator corresponding generally to section lines 8—8 of FIG. 1 and associated rotor and back-iron ring.

In one practical embodiment as shown in FIG. 8, the d.c. brushless motor may utilize a unitary rotor 28 with eight poles and a slotted stator 12 with nine teeth. However, alternative pole/slot combinations may be employed.

As shown in FIG. 3 and FIG. 4, a generally tubular precision bearing carrier 32, which may be made, for example, from 303 stainless steel, a plurality of electrical terminals 34, and a plurality of optional Hall sensor pockets 36 are preferably also embedded as integral parts of the injection molded base housing 14 by properly positioning them in the base housing mold (not shown) at the same time as the stator assembly 12. This injection molding of the base housing 14 with an embedded stator assembly 12 and embedded precision bearing carrier 32 not only reduces motor assembly time, but maintains the static and rotating components in the proper radial and angular spatial relationships during final assembly and operation. In other embodiments, the bearing carrier 32 may be made from the same engineered plastic material as the housing base 14 either as a separate component or as an integral part of the base housing. Those skilled in the art will recognize that the stator 12 and any other separately fabricated components of the integrally molded assembly may be accurately positioned within the mold by means of suitable fixtures or protrusion in the mold corresponding to housing apertures 38 in the finished base.

The depicted embodiment of the d.c. brushless motor 10 of the present invention also includes a motor cover 40 with an upper volute portion 42 that is adapted to attach or snap into place over the motor base housing 14 to thereby define a complete peripheral volute which functions as the exit of the rotating impeller assembly 44. A generally ring-shaped shroud 46, which may contain a contour that mirrors that of the lower volute and thereby forms part of a flow cutoff feature, is preferably coupled between the motor cover 40 and the impeller 44 to form an annular entrance 48 to the rotating impeller assembly. The shroud 46 may be made, for example, from 6061-T6 aluminum or molded from thermoplastic material. The motor cover 40 and base housing 14 may be molded from Noryl® which is modified polyphenylene oxide and polyphenylene ether with good heat resistance, extremely low water absorption (0.07%), and long term dimensional stability.

Figure 5:
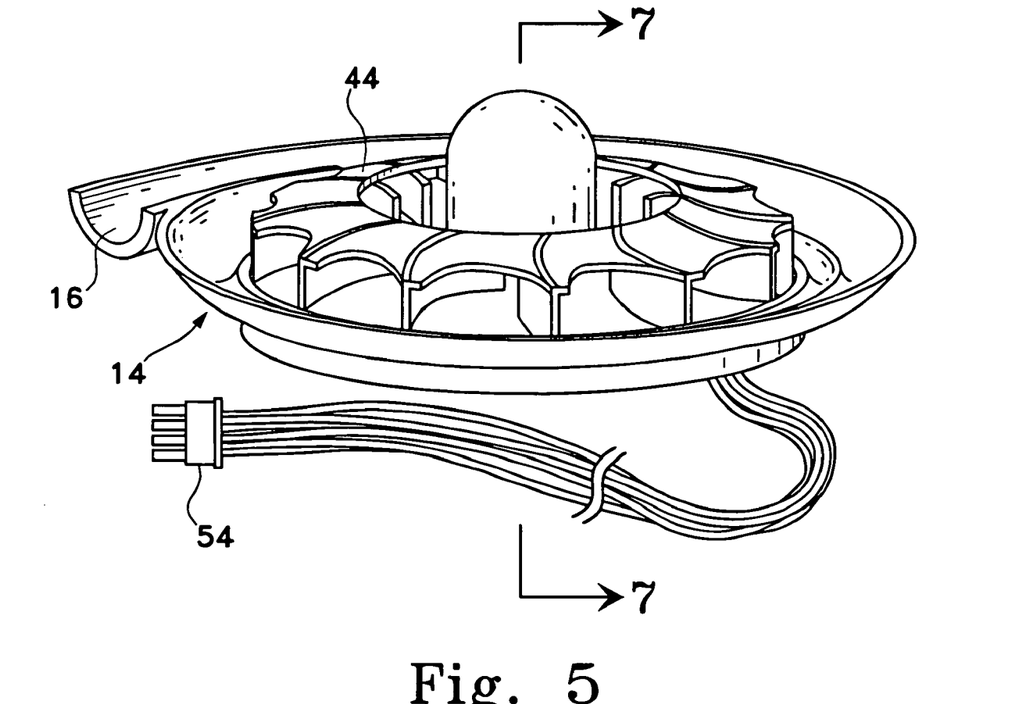
FIG. 5 is a top perspective view of a partially assembled d.c. brushless motor of FIG. 1.
Figure 6:
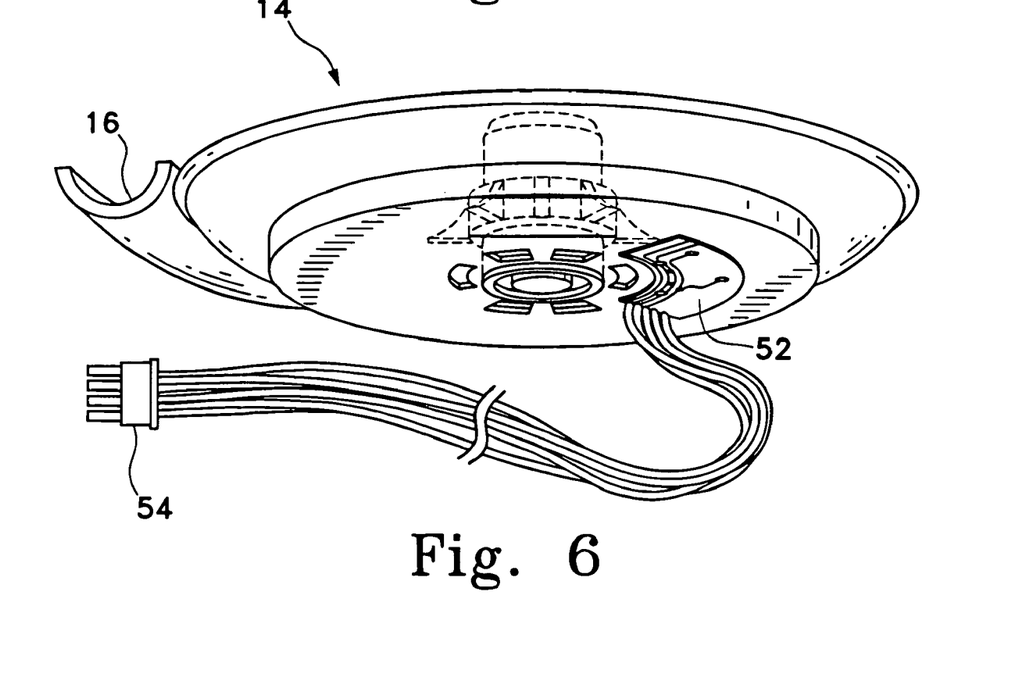
FIG. 6 is a bottom perspective view of the partially assembled d.c. bushless motor of FIG. 5.

As depicted in FIG. 5 and FIG. 6, the exemplary motor 10 may also include a printed circuit board (PCB) driver assembly 50 which is preferably coupled to the bottom portion of the motor housing and which may include a commutation circuit board 52, or for sensorless configurations this board may be simplified by eliminating Hall sensors and their associated pockets. As depicted the commutation circuit board includes a power connector 54 and is adapted to fit within a recess 56 (FIG. 3) on the bottom portion of the motor housing 14. The recess includes the molded-in electrical terminals 34 which operatively couple the commutation circuit board 52 to the integrated stator assembly 12, and which, in one exemplary preferred embodiment of the present invention, are precisely positioned in both angular position and radial alignment with angular position being defined relative to the coils 20, while radial alignment may be defined relative to the rotational axis. The PCB driver assembly 50 is preferably designed with this "in the mold" terminal-locating (preset "tuning" of the Hall sensors) technique to ensure that the combination of PCB driver 50 and molded stator 12 assemblies yields the desired positional relationship of integral Hall sensors to coils, with the integral Hall sensors 58 preferably disposed in the Hall sensor pockets 36.

As best seen in FIG. 7 and FIG. 8, the motor 10 also includes a generally cup-shaped rotor assembly 28 comprising a generally ring-shaped rotor magnet 60 having a number (for example, eight) of radially oriented poles 62 which is preferably incorporated into an integral generally cup-shaped impeller 44 together with a generally ring-shaped rotor hub back-iron ring 64 of magnetic steel (or other suitable ferromagnetic material) to thereby provide a magnetic return path between two adjacent poles of the rotor magnet, as shown by the dashed lines in FIG. 8. A person skilled in the art would readily recognize that the aforementioned preset tuning is advantageous in terms of (a) eliminating labor (tuning process), and (b) assuring consistency of performance among all assemblies. In particular, the individual Hall sensors 58 will be optimally located radially relative to rotor magnet 60 to detect the approach of the next rotor pole 62 at a known angular position relative to a given stator tooth 20 and thereby provide an accurate positional feedback signal to the commutation circuit board 52. The impeller 44 has a circular base rim 66 adapted to accommodate the rotor magnet 62 and is operatively coupled to the motor housing, as generally illustrated in FIG. 5. The rotor magnet 62 may be formed of a suitable permanent magnetic material such ceramic or high energy rare earth materials, for example a high energy ferromagnetic boron ally such as NdFeB, and is slightly smaller in diameter than the diameter of the rotor hub which, in turn, is made slightly smaller than the inner diameter of the impeller base rim. Specifically, in this example, the back-iron ring 64 is preferably embedded in the inner surface 68 of the base rim 66 of the impeller 44 (as best seen in the cross-section of FIG. 7), and the rotor magnet 62 (which could be damaged during the molding process) is preferably adapted to be subsequently adhesively secured within the back ring 64. However, in other embodiments constructed of other materials and/or fabricated using other molding techniques, both the back ring 64 and the magnetic rotor 62 could be adhesively secured to the impeller or integrally molded therewith. In any event, a two-plane balance is preferably performed on the integral impeller assembly after the back ring and magnetic rotor have been installed, for example by removal of material from the exemplary locations 70A,70B.

In accordance with an exemplary embodiment of the present invention, the impeller 44 may be molded from a suitable thermoplastic; the rotor magnet 62 may be a bonded ferrite magnet, while the rotor hub 28 may be constructed from 416 stainless steel. In another exemplary embodiment, the impeller 44 may be constructed from 6061-T6 aluminum.

As best seen in FIG. 7, the motor 10 includes a generally cylindrical motor shaft 72 adapted to rotate on front and rear bearings 74,76 which are within the precision bearing carrier and preloaded via a compression spring 78. Similar to the bearing carrier 32 in the housing base, the shaft 72 is preferably embedded as an integral part of the injection molded motor cover 40 during the injection molding process. As best seen in FIG. 1, a generally ring-shaped shim 80 may be coupled between the compression preload spring 78 and the front bearing 74. On the opposite side, a housing snap ring 82 may be coupled between the rear bearing 76 and the compression preload spring 78. A shaft snap ring 84 may be used between the precision bearing carrier 32 and the stator assembly 12. By thus providing a precision bearing assembly about the rotational axis 86 defined by the bearing carrier 32 and the motor shaft 72, and by integrally molding the bearing carrier 32 with the stator assembly 12 and by integrally molding the motor shaft 72 and the back ring 64 (which supports the rotor magnet 60) with the rotor assembly 28, it is possible to maintain a relatively small air gap 88 between the inner circumference 90 of the ring-shaped rotor magnet 60 and the ends 92 of the radial stator arms 20 which define the outer circumference 22 of the stator assembly 12.

In accordance with an exemplary embodiment of the present invention, the front and rear bearings 74,76 may be made from chrome alloy steel, the shim 80 may be made from 300 stainless steel, the housing snap ring 82 may be made from carbon steel, the shaft snap ring 84 may be made from beryllium-copper alloy, and the compression preload spring 78 may be made from spring steel.

The resultant motor has relatively low motor length (L) to overall motor diameter (D) ratio and may be used in a variety of applications. In accordance with one exemplary embodiment of the present invention, an L/D ratio of about ¼ was achieved using a motor length of about 1.25 inch, and an overall motor diameter (including peripheral volute) of about 5 inch. Other L/D ratios may be utilized depending on specific rotary pump applications. For example, the (low L/D ratio) motor of the present invention may be used as a CPAP (continuous positive airway pressure) device for OSA (obstructive sleep apnea) patients.

It should be noted that practicing the invention is not limited to the applications described hereinabove. Many other applications and/or alterations may be utilized provided such other applications and/or alterations do not depart from the intended purpose and scope of the present invention. For example, the disclosed motor may be used to drive other rotating mechanisms such as a mechanical gyroscope or an optical scanner.

It should also be appreciated that features illustrated or described as part of one embodiment can be used in another embodiment to provide yet another embodiment such that the features are not limited to the specific embodiments described above. Thus, it is intended that the present invention cover all such modifications, embodiments and variations as long as they come within the scope of the present invention.

The invention claimed is:

1. An impeller mechanism incorporating a brushless dc motor, said mechanism comprising:
    a fixed portion further comprising
        a molded housing defining an internal axis of rotation and a lower portion of a peripheral volute,
        a separately fabricated stator assembly integrally molded within a base portion of the housing in an annular region between the axis and the volute, the stator assembly including a plurality of radially extending magnetizable teeth collectively defining a circumference of the stator assembly, and a respective electrical winding about each of the teeth for selectively magnetizing the individual teeth of the stator assembly, and
        a hollow bearing support concentric with the axis and extending though the stator assembly into the housing;
    a rotating portion further comprising
        a ring shaped brushless rotor assembly including a plurality of radially oriented permanently magnetized poles arranged about a circle, the rotor assembly encircling, in close proximity and concentric to the selectably magnetizable teeth of the stator assembly and separated therefrom by a cylindrical air gap concentric with a central axis and said air gap extending radially between the rotor assembly and the stator assembly,
        a ferromagnetic back-iron ring encircling the rotor assembly for providing a flux return path between two adjacent poles of the rotor assembly,
        a hat-shaped rotor support disposed about the axis and over the stator assembly, the rotor support including a downwardly extending outer lip on which is mounted the back-iron ring and a hollow crown extending upward of the outer lip, wherein the bearing support extends into the crown and the crown is above the stator assembly,
        an impeller assembly disposed on an upper side of the rotor support and over the air gap,
        a rotating shaft concentric with said axis and extending from an interior portion of the hollow bearing support into the crown of the rotating support; and
        a precision bearing assembly coupled between an interior surface of the hollow bearing support and an outer surface of the rotating shaft.

2. The impeller mechanism of claim 1, wherein the overall length of the mechanism along the axis from the bottom of the housing to the top of the crown portion of the rotating support is substantially less than the diameter of the peripheral volute.

3. The impeller mechanism of claim 2, wherein the hat shaped support is integrally molded about the back ring and the rotating shaft.

4. The impeller mechanism of claim 3, wherein the ring shaped rotor assembly is secured to an inner circumference of the back-iron ring after the downwardly extending lip portion of the hat shaped support has been molded about an outer circumference of the back-iron ring.

5. The impeller mechanism of claim 3, wherein the ring shaped rotor assembly is secured to the back-iron ring after the back-iron ring has been secured to the downwardly extending lip portion of the hat shaped support.

6. The impeller mechanism of claim 3, wherein at least a portion of the volute is integrally molded with the base portion of the housing, and at least a portion of the impeller is integrally molded with hat shaped rotor support.

7. A brushless motor mechanism comprising
    a stator portion further comprising
        a housing including a base portion defining an internal axis of rotation and at least a lower portion of a peripheral volute,
        a stator assembly secured within the housing about the axis, the stator assembly including a plurality of radially extending magnetizable teeth collectively defining an outer circumference of the stator assembly concentric with the axis, the stator assembly also including a respective electrical winding about each of the teeth for selectively magnetizing the individual teeth of the stator assembly, and
        a fixed bearing support concentric with the axis and extending through the stator assembly into the housing;
    a rotor portion further comprising
        a ring shaped brushless rotor assembly including a plurality of radially oriented permanently magnetized poles arranged about a circle, an inner surface of the rotor assembly in close proximity and concentric to the selectably magnetizable poles of the stator assembly and separated radially therefrom by a cylindrical air gap concentric with the axis,
        a ferromagnetic back-iron ring encircling an outer surface of the rotor assembly for providing a flux return path between two adjacent poles of the rotor assembly,
        a rotating support disposed about the axis above the stator assembly, the rotating support including a raised hollow crown portion above the stator assembly, the rotating support also including an annular base rim at the periphery of the crown and said base rim having a downwardly extending outer lip secured to the back-iron ring, wherein the base rim overhangs the stator assembly, a rotating bearing support concentric with the fixed bearing support and extending along the axis into the hollow crown portion of the rotating support; and a bearing assembly coupled between the fixed bearing support and the rotating bearing support, the bearing assembly being oriented along the axis, wherein the housing is molded about the fixed bearing support and the stator assembly, the rotating support is molded about the rotating bearing support and the back-iron ring, at least a lower portion of a peripheral volute is integrally molded with at least the base portion of the housing, an annular impeller is integrally molded with the rotating support, the impeller assembly is disposed on an upper side of the annular base rim of the rotating support, the base rim portion is disposed between the crown portion and the volute, an upper portion of the housing and crown portion of the rotating support cooperate to define an annular inlet to the impeller assembly, and an outer circumference of the impeller assembly is in direct communication with the peripheral volute.

8. The brushless motor mechanism of claim 7 wherein the bearing is a precision bearing assembly comprising a pair of spaced apart preloaded ball bearing races.

9. A method of constructing a brushless motor mechanism, comprising the steps:

forming a stator assembly including a plurality of radially extending magnetizable teeth collectively defining an outer circumference of the stator assembly, the stator assembly also including a respective electrical winding about each of the teeth for selectively magnetizing the stator assembly and a plurality of electrical terminals for selectively activating said windings;

forming a hollow bearing support defining a first axis;

supporting the stator assembly concentric about the first axis in a predetermined angular orientation;

molding a housing base portion and at least a portion of an integral volute about the hollow bearing support and the thus-supported stator assembly to thereby form a first molded portion of the rotating mechanism with the hollow bearing support extending through the stator assembly into the base portion;

forming a ferromagnetic back-iron ring;

forming a shaft defining a second axis;

supporting the ferromagnetic back-iron ring concentric about a second axis;

molding a generally cup-shaped rotating support and at least a portion of an integral impeller about the shaft and the thus-supported back-iron ring to thereby form a second molded portion of the rotating mechanism with the shaft and hollow bearing support extending into the interior of a hollow cup portion of cup-shaped rotating support, and with the back-iron ring disposed within an outer lip of a base rim of the cup-shaped rotating support;

forming a ring shaped brushless rotor assembly including a plurality of radially oriented permanently magnetized poles arranged about a circle;

securing the rotor assembly to an inner circumference of the back-iron ring within the second molded portion to thereby form a rotating assembly with a flux return path between two adjacent poles of the rotor assembly; and disposing a low friction bearing between the shaft and the hollow bearing support to thereby couple the first molded portion to the rotating assembly such that the first axis is coaxially aligned with the second axis with the rotor assembly surrounding the magnetizable poles of the stator assembly and separated therefrom by a cylindrical air gap concentric with the axis, wherein the air gap is below the impeller and extends radially between the stator assembly and rotor assembly.

10. A fluid pump assembly comprising:

a molded housing defining an internal axis of rotation and a peripheral volute, wherein the housing has a fluid inlet disposed on one side of the housing and a base on the opposite side of the housing;

a bearing support mounted to the base of the housing and which is concentric with the axis and extends axially from the base towards the fluid inlet;

a rotating section having a center hollow crown, wherein the bearing support protrudes into the hollow crown and the rotating section is rotatably attached to the bearing support;

a first side of the rotating section including an impeller and an inlet aligned with the inlet of the housing, said impeller includes a base rim extending radially outward from a periphery of the crown and an impeller exhaust aligned radially with the peripheral volute;

a second side of the rotating section, opposite to the first side, includes a mounting for a rotor of a brushless D.C. motor;

the rotor is concentric with the bearing support, and said rotor has a rotor surface defining an annular ring of the rotor;

a stator of the brushless D.C. motor which is integrally molded with the base, said stator is concentric with the bearing support and axially aligned with the base rim of the impeller, wherein said stator has a stator surface defining an annular ring of the stator, and an air gap of the motor extending radially between the annular ring of the stator and the annular ring of the rotor, wherein the stator, radial air gap and rotor are in a common plane perpendicular to the internal axis of rotation.

11. The fluid pump assembly of claim 10 wherein the fluid pump is a fan and the fluid inlet is an air inlet.

12. The fluid pump assembly of claim 10 wherein the rotating section and impeller are integrally molded together.

13. The fluid pump assembly of claim 10 wherein the molded housing is a split housing having a first housing section including the fluid inlet, an inner annular surface facing the impeller and a first volute section extending radially from the inner annular surface, and a second housing section including the base and a second volute section extending radially from the base, wherein the first housing section and second housing section mate together to form the housing.

14. The fluid pump assembly of claim 10 wherein the stator includes a plurality of radially extending magnetizable teeth collectively defining the stator surface.

15. The fluid pump assembly of claim 10 wherein the rotor includes a magnetic ring and a concentric ferromagnetic back-iron ring, wherein the magnetic ring includes the rotor surface.

16. The fluid pump assembly of claim 10 further comprising a shaft concentric with the axis and rotatably mounted in the bearing support, wherein the shaft is the attachment between the rotating section and bearing support.

17. The fluid pump assembly of claim 10 wherein the stator extends radially from the crown to underneath the base rim and impeller.

18. The fluid pump assembly of claim 10 further comprising a shaft mounted in and coaxial to the bearing support, wherein the shaft provides the attachment between the bearing support and hat-shaped rotating section.

19. The fluid pump assembly of claim 10 wherein the bearing support has an axial length, and a first portion of the axial length is within the hollow crown and a second portion of the axial length is attached to and radially inward of the stator.

20. The fluid pump assembly of claim 19 wherein the second portion of the axial length of the bearing support is in the common plane.

* * * * *